US009954743B2

(12) United States Patent
Lee et al.

(10) Patent No.: US 9,954,743 B2
(45) Date of Patent: Apr. 24, 2018

(54) APPLICATION-AWARE NETWORK MANAGEMENT

(71) Applicant: HEWLETT-PACKARD DEVELOPMENT COMPANY, L.P., Houston, TX (US)

(72) Inventors: Jung Gun Lee, Palo Alto, CA (US); Manfred R. Arndt, Palo Alto, CA (US); Zafar A. Qazi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 211 days.

(21) Appl. No.: 14/911,266

(22) PCT Filed: Aug. 12, 2013

(86) PCT No.: PCT/US2013/054589
§ 371 (c)(1),
(2) Date: Feb. 9, 2016

(87) PCT Pub. No.: WO2015/023256
PCT Pub. Date: Feb. 19, 2015

(65) Prior Publication Data
US 2016/0191348 A1    Jun. 30, 2016

(51) Int. Cl.
*H04L 12/26* (2006.01)
(52) U.S. Cl.
CPC .......... *H04L 43/026* (2013.01); *H04L 43/028* (2013.01)
(58) Field of Classification Search
None
See application file for complete search history.

(56) References Cited

U.S. PATENT DOCUMENTS

| 6,718,380 B1 | 4/2004 | Mohaban et al. |
| 7,496,661 B1 * | 2/2009 | Morford ............. H04L 41/5025 709/224 |
| 7,664,048 B1 | 2/2010 | Yung |

(Continued)

FOREIGN PATENT DOCUMENTS

| CN | 101252541 | 8/2008 |
| CN | 102209032 A * | 10/2011 |

(Continued)

OTHER PUBLICATIONS

International Search Report and Written Opinion, International Application No. PCT/US2013/054589, dated May 29, 2014, pp. 1-8.

(Continued)

*Primary Examiner* — Natisha Cox
(74) *Attorney, Agent, or Firm* — Hewlett Packard Enterprise Patent Department

(57) ABSTRACT

In one implementation, an application-aware network control system determines that a network flow has been instantiated, derives network flow features associated with the network flow in response to determining the network flow has been instantiated, and provides the network flow features to an application identification module. In response to an application identification signal, the application-aware network control system ceases deriving the network flow features, and applies a flow action to the network flow based on an application identification report received from the application identification module.

15 Claims, 5 Drawing Sheets

(56) References Cited

U.S. PATENT DOCUMENTS

| | | |
|---|---|---|
| 8,413,111 B2 | 4/2013 | Paster |
| 2003/0005112 A1* | 1/2003 | Krautkremer ....... H04L 41/0213 709/224 |
| 2005/0232153 A1* | 10/2005 | Bishop .................... H04L 47/10 370/235 |
| 2008/0239956 A1* | 10/2008 | Okholm .................. H04L 47/10 370/232 |
| 2009/0161544 A1 | 6/2009 | Kelly et al. |
| 2010/0095367 A1* | 4/2010 | Narayanaswamy ....................... H04L 63/0245 726/12 |
| 2010/0309786 A1* | 12/2010 | Moisand ............. H04L 67/2804 370/235 |
| 2012/0304277 A1 | 11/2012 | Li et al. |
| 2014/0280889 A1* | 9/2014 | Nispel .................... H04L 43/04 709/224 |
| 2014/0282823 A1* | 9/2014 | Rash ....................... H04L 63/20 726/1 |

FOREIGN PATENT DOCUMENTS

| | | |
|---|---|---|
| JP | 2008-193221 | 8/2008 |
| WO | WO-2012/047275 | 4/2012 |
| WO | WO-2013/044956 A1 | 4/2013 |

OTHER PUBLICATIONS

Jinyan Cao et al., "High-Performance Machine Learning in Software-Defined Networks," Apr. 24, 2013, pp. 1-9.

Li Sanping, Ph.D., "Towards Ultra-High Speed Online Network Traffic Classification Enhanced with Machine Learning Algorithms and OpenFlow Accelerators," 2012, pp. 1-185.

* cited by examiner ns, provide (or make available) information about the identities of the applications via an interface such as an application programming interface (API) to other network devices or network controllers, and/or make other use of the identities of the applications to manage the communications network. Such systems and methodologies can be referred to

APPLICATION-AWARE NETWORK MANAGEMENT

BACKGROUND

Some network management systems (e.g., network devices and/or software hosted at network devices) attempt to provide application-aware network management (or capabilities) based on static properties of network connections via which applications communicate. For example, some network management systems determine the identity of applications communicating via networks by identifying port numbers, Internet Protocol (IP) addresses, domain names, or combinations thereof.

Other network management systems honor or respect quality of service (QoS) values contained within data packets with which an application on an end-user device can mark itself. Such network management systems implicitly trust the QoS information provided by applications to determine the identity of applications. Yet other network management systems rely on deep packet inspection (DPI) to identify applications. After determining the identity of one or more applications, such network management systems provision the networks (e.g., alter parameters such as quality of service (QoS) parameters or firewall parameters of the networks) based on the identity of the applications.

DETAILED DESCRIPTION

Figure 1:
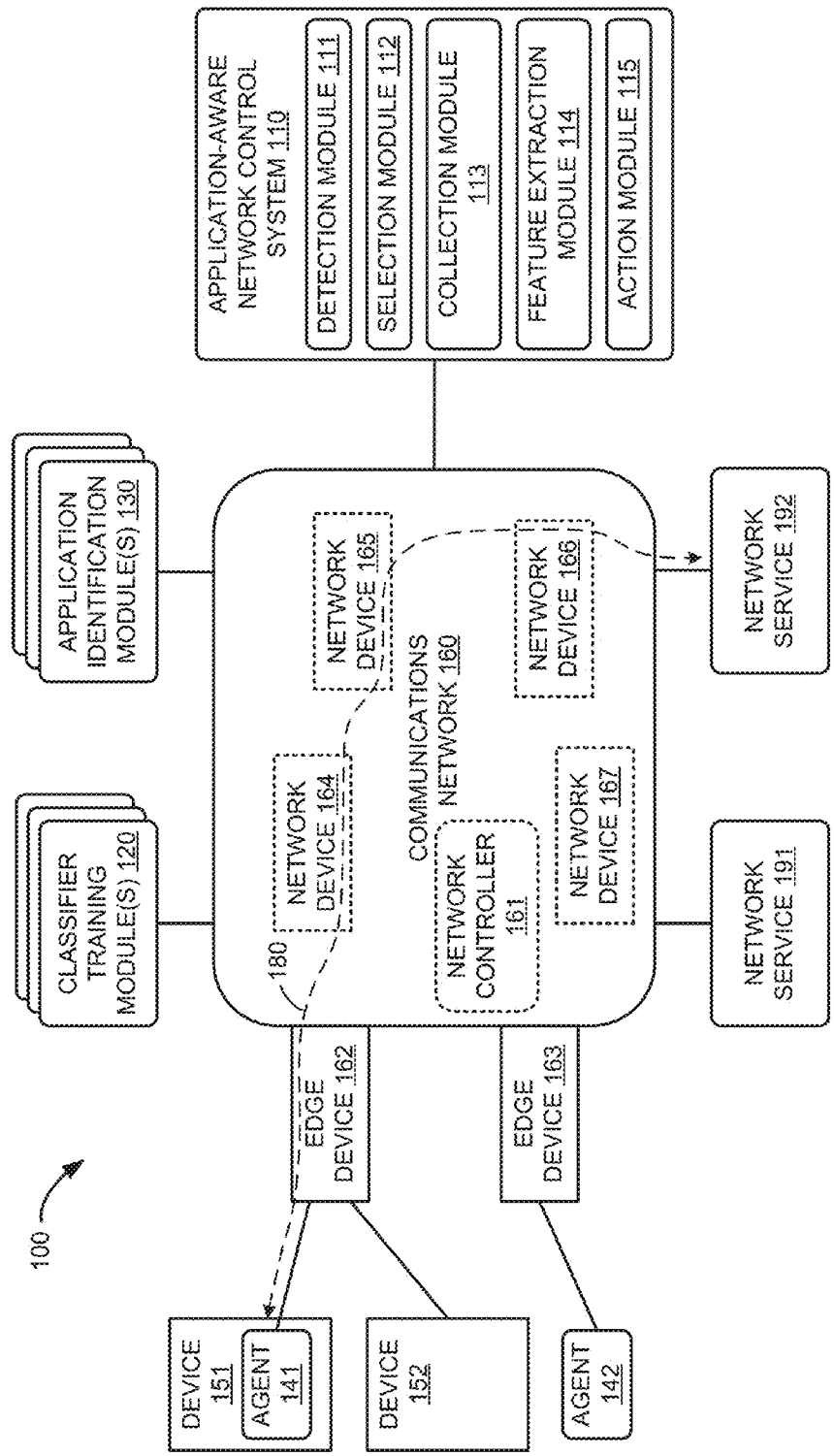
FIG. 1 is a schematic block diagram of an environment including a communications network and an application-aware network control system, according to an implementation.

Network management systems (e.g., network devices and/or software hosted at network devices) that rely on static properties of network connections to provide application awareness (i.e., to identify the application communicating via those network connections) often fail to accurately determine the identity of applications for a variety of reasons. For example, many applications dynamically negotiate per-session properties (e.g., application port numbers) of the network connections via which they communicate. In other words, the properties of the network connections relied upon by such applications are not defined a priori. Thus, a network management system cannot rely on statically defined properties of network connections to identify applications.

Additionally, many applications communicate via network connections that share these static properties. For example, a group of Voice over Internet Protocol (VoIP) applications can each communicate via network connections using a common port number. Thus, these applications cannot be individually identified by this property of their network connections. As another example, many different applications and different classes of applications transport data using the Hypertext Transfer Protocol (HTTP) or the Hypertext Transfer Protocol Secure (HTTPS). As a result, many or all of the per-session properties contained in the data packet headers of network connections of these applications are the same. Because the per-session properties of these network connections are shared across many applications, such network management systems are unable to determine the identities of these applications based on static properties.

Moreover, network management systems that rely on identification information provided by applications (e.g., applications hosted at end-user devices or other devices that communication via a network) are vulnerable to misinformation from applications. For example, applications can identify themselves as other higher priority applications by requesting or identifying a class of service desired to cause such network management systems to provision networks in a manner that is unintended, but favorable (e.g., enhanced quality of service (QoS), additional throughput or redundant communications links for those applications. Because such network management systems implicitly trust the identification information provided by applications, these network management systems can provision networks based on the misinformation provided by the applications, resulting in allocation of resources within the networks that are not intended by network architects or administrators.

Deep packet inspection (DPI) can provide accurate application identification by analyzing the data exchanged by applications, but incurs high computational costs, are difficult to scale, and not reliable for use with end-to-end encrypted traffic (e.g., virtual private networks (VPNs), Hypertext Transport Protocol Secured (HTTPS) communications, and secure real-time protocol (SRTP) communications). As a result, DPI is typically performed at high-end network equipment or dedicated computing systems to which data from network connection are mirrored or forwarded for analysis.

Implementations discussed herein describe systems and methodologies that facilitate efficient application identification within a communications network for application-aware network management. For example, implementations discussed herein include network devices that, within a control plane of a network, generate application classifiers using application identifiers provided by application identification agents, derive network flow features for network flows, and apply those application classifiers to the network flow features to determine the identities of applications communicating via the network flows within the communications network. Moreover, some implementations discussed herein perform application-aware network management in a manner that does not require manual effort to maintain application signatures. The network devices can then apply actions to the network flows based on the identities of the applications, provide (or make available) information about the identities of the applications via an interface such as an application programming interface (API) to other network devices or network controllers, and/or make other use of the identities of the applications to manage the communications network. Such systems and methodologies can be referred to as application-aware because they perform network management (e.g., apply actions) based on identities of applications.

Moreover, some implementations discussed herein can be advantageously applied within a programmable network or software-defined network (SDN). In such implementations, functionalities related to decisions or intelligence about how network flows are handled (i.e., the control plane) is separated or decoupled from the exchange of data within the network flows (i.e., the data plane). As a result, methodologies discussed herein can be applied to a variety of network devices within an SDN.

As a specific example, an SDN can include a controller (or network controller or a cluster of controllers) within a control plane that provides instructions to network devices regarding forwarding of network flows. Some of these network devices can host application identification modules to identify applications associated with network flows. Such network devices can receive application classifiers from the controller, and apply these application classifiers within application identification modules to identify applications associated with network flows. Others of the network devices may not host application identification modules. Such network devices can forward network flows or network flow features thereof to the controller (or some other network device or service within the control plane), and the network controller can apply these application classifiers within application identification modules to identify applications associated with network flows.

Because the controller provides the application classifiers to the network devices able to host application identification modules and classifies network flows of network devices unable to host application identification modules, applications can be identified consistently across the SDN. Moreover, the controller can distribute or make accessible policies throughout the SDN. Such policies can define actions that should be applied to network flows (e.g., at or by network devices) that are associated with particular applications, and can be consistently applied within the SDN. Additionally, network flows traversing a variety of heterogeneous network devices can be classified (i.e., applications associated with those network flows can be identified). That is, network flows can be classified at network devices that support hosting an application identification module or within the control plane (e.g., at the controller or another network device or service within the control plane) for network devices that do not support hosting an application identification module.

As yet another example of implementations discussed herein within an SDN, ground truth data regarding applications associated with network flows (e.g., application identifiers provided by application identification agents that are associated with particular network flows) can be received from a variety application identification agents from different portions or segments of the SDN. That is, network devices can provide such ground truth to the controller, and the controller can provide application classifiers based on such ground truth to network devices across the SDN. Accordingly, ground truth data can be applied widely throughout the SDN rather than at individual network devices, small groups of network devices, or limited portions or segments of the SDN. In addition, within an SDN, the controller can provide ground truth data to controllers within other SDN; so that ground truth can be applied widely and consistently across any SDN and across any device, including individual logical, virtualized, or physical communications networks that only include devices without any application identification agents.

FIG. 1 is a schematic block diagram of an environment including a communications network and an application-aware network control system, according to an implementation. Environment 100 illustrated in FIG. 1 includes application-aware network control system 110, classifier training module(s) 120, application identification module(s) 130, agents 141 and 142, communications network 160, and network services 191 and 192. Application-aware network control system 110 is a system that facilitates identification of applications communicating via network flows of communications network 160.

As illustrated in FIG. 1, application-aware network control system 110 includes a group of modules that perform various functionalities of application-aware network control system 110. As used herein, the term "module" refers to a combination of hardware (e.g., a processor such as an integrated circuit or other circuitry or a processor-readable medium) and software (e.g., machine- or processor-executable instructions, commands, or code such as firmware, programming, or object code). A combination of hardware and software includes hardware only (i.e., a hardware element with no software elements such as an ASIC), software hosted at hardware (e.g., software that is stored at a memory such as RAM, a hard-disk or solid-state drive, resistive memory, or optical media such as a DVD and/or executed or interpreted at a processor), or hardware and software hosted at hardware.

Detection module 111 is a combination of hardware and software that detects instantiation of network flows within a communications network. A network flow is a collection of related data that traverses or is exchanged or transmitted through a communications network. For example, a network flow can be a group of related data packets. As more specific examples, a network flow can be a Transport Control Protocol (TCP) connection with a particular port number, a group of Universal Datagram Protocol data packets or messages exchanged between two Internet Protocol (IP) addresses, all data packets from or to a particular Media Access Control (MAC) address or IP address, data packets with a common (i.e., the same) Virtual Local Area Network (VLAN) tag (i.e., identifier), or all data packets from or to a common network device (e.g., switch) physical port.

Detection module 111 communicates with or monitors network devices (or software hosted thereon) to determine when a new network flow has been instantiated. For example, detection module 111 can access tables (e.g., forwarding or routing tables) within a network device, receive a signal (or notification) from the network device (or software hosted thereon) or a network controller associated with the network device, or interpret communication between the network device and a network controller to determine that a network connection such as a TCP connection is requested or established.

Selection module 112 selects network flows from the newly (or recently) instantiated network flows detected by detection module 111 that will be used to generate application classifiers according to a variety of methodologies. For example, selection module 112 can communicate with collection module 113 to determine for which of the newly instantiated network flows detected by detection module 111 application identifiers are available (e.g., have been received by collection module 113 as discussed in more detail below), and can select those network flows. In some implementations, all such network flows (i.e., network flows for which application identifiers are available) are selected by selection module 112. In other implementations, a subset of such network flows are selected by selection module 112. Thus, in some implementations, not all network flows for which application identifiers are available are selected by selection module 112.

As an example, in some implementations, network flows from the newly instantiated network flows for which application identifiers are available are randomly selected, for example to reduce processing overhead or increase scalability of application-aware network control systems. As used herein, the terms "random" and "randomly" apply to both truly random processes or mechanisms and pseudo-random processes or mechanisms. Thus, network flows from the newly instantiated network flows for which application identifiers are available can be randomly selected using, for example, a pseudo-random number generator, a truly random input, or a combination thereof (e.g., a pseudo-random number generator with a truly random input as a seed value).

As another example, selection module 112 can communicate with collection module 113 to determine which network flows are requested or initiated by particular computing systems hosting an application identification agent (or by computing systems hosting particular application identification agents), and can select those network flows. In other words, selection module 112 can select the network flows that have particular computing systems (or particular application identification agents hosted at those computing systems) as an endpoint (or a host of an endpoint) of communication through the communications network.

As yet another example, selection module 112 can communicate with collection module 113 to determine the application identifier (e.g., an application name or type) for (or associated with) network flows for which application identifiers are available. Selection module 112 can then select network flows associated with (e.g., to, from, or having as an endpoint) a particular application or a portion or percentage of the network flows associated with that particular application. That is, selection module 112 can select all or some portion of the network flows via which various instances of a particular application (i.e., instances of the application hosted as one or multiple computing systems) communicates. A network flow via which an application (or an instance of an application) communicate can be referred to as for or associated with that network flow.

Moreover, in some implementations, selection module 112 can adaptively select network flows according to a variety of methodologies. For example, selection module 112 can communicate with collection module 113 to determine the application identifier for network flows for which application identifiers are available and with a classifier training module such as classifier training module(s) 120 (or some other entity within a control plane of a communications network) to determine for which applications additional training data (ground truth network flow features) would improve application classifiers.

Thus, for example, at one time, selection module 112 can select all or a large portion of network flows associated with a particular application based on input from a classifier training module. This can be useful when the classifier training module is attempting to generate an initial application classifier for that particular application. At a later time, selection module 112 can select a small or moderate portion of network flows associated with that particular application based on input from the classifier training module. This can be useful after the classifier training module has generated (or trained) the initial application classifier for that particular application and is generating a revised application classifier (using a small portion of the network flows for that application) or is validating the initial application classifier to determine whether generating a revised application classifier is required to satisfy a policy. In some implementations, if the classifier training module determines to generate a revised application classifier (i.e., an application classifier that is updated or revised relative to an initial or previously generated application classifier), the classifier training module can provide a signal to selection module 112 to cause selection module 112 to again select all or a large portion of network flows associated with that particular application.

In other implementations, selection module 112 can communicate with a network controller such as network controller 161 (or some other entity within a control plane of a communications network) to determine the load (or utilization) of a communications network or the network device hosting the classifier training module, and can select a high percentage of network flows if the load is low and a low percentage of the network flows if the load is high to avoid inefficient use of the communications network and/or network devices within the communications network.

Collection module 113 communicates with application identification agents to receive application identifiers of applications for which network flows are instantiated within a communications network. Applications identifiers are values such as alphanumeric strings that identify applications. In some implementations, an application identifier is or includes a name of an application. In some implementations, an application identifier includes information about a version or build of an application. Furthermore, in some implementations, an application identifier includes information about a type or class of an application. Additionally, collection module 113 communicates with the application identification agents and/or detection module 111 to identify the network flow associated with each application identifier received from the application identification agents. Thus, collection module 113 can establish a mapping between newly instantiated network flows detected by detection module 111 and application identifiers received from application identification agents.

Application identification agents are applications (e.g., instructions stored at one or more non-transitory processor-readable media) hosted at clients of a communications network and provide information about applications that initiate or request network flows or respond to network flow requests within the communications network. Such information can include an application identifier of an application and parameters of a network flow that can be used to identify the network flow. Clients of a communications network are devices that communicate via that communications network. For example, computing systems such as notebooks, tablet devices, smartphones, desktops, servers, network switches, network routers, network gateways, network bridges, or other computing systems or applications hosted thereon that communicate via the communications network can be referred to as clients of the communications network.

For example, an application identification agent can be installed at each of a plurality of computing systems to determine which applications hosted at the computing systems request or initiate network flows information. As a specific example, an application identification agent can collect parameters such as the network socket (e.g., an IP address and port number pair) and an identifier of the application using the network socket (e.g., a filename of the executable file including instructions that when executed realize the application identification agent or a unique alphanumeric string that identifies the application). The application identification agent can then provide this information to a collection module such as collection module 113 in real time (i.e., as the information is gathered) or at various intervals of time. Collection module 113 may also access parameters (e.g., an IP address and port number pair) of network flows within a communications network at a network device to correlate the information received from an application identification agent with a network flow within the communications network to identify the network flow that corresponds to an application identifier.

Feature extraction module 114 extracts (or derives) features of network flows within a communications network. As discussed herein, features of network flows (or network flow features) are derived from data (e.g., data within data packets) transferred within network flows. For example, the following network flow features can be extracted from network flows:

Source IP/Destination IP/Source Port/Destination Port;

Flow start epoch time (in milliseconds or a higher accuracy);

Flow end epoch time (in milliseconds or a higher accuracy);

Arrival times of data packets (absolute or relative one to another);

Total uplink/downlink data packets;

Total uplink/downlink bytes;

Packet sizes of the first/packets in the uplink (e.g., relative to an endpoint);

Packet sizes of the first m packets in the downlink (e.g., relative to an endpoint); and Packet sizes of the first n packets in a bi-direction (e.g., relative to an endpoint).

In the example above, the terms "l", "m", and "n" may be any number. By way of particular example, l=7, m=6, and n=13. In some implementations, data packets of a network flow can also be referred to as network flow features of that network flow. In such implementations, network flow features such as those discussed above can be derived from the data packets of the network flow at an application identification module, a classifier training module, or some other entity.

Additionally, feature extraction module 114 provides network flow features to a classifier training module such as classifier training module(s) 120 for network flows with associated application identifiers that are selected by selection module 111 to generate application classifiers. Feature extraction module 114 also provides network flow features of network flows to an application identification module such as application identification module(s) 130 to identify applications associated with those network flows. Such network flow features can be provided in real time, at various time intervals (e.g., periodically), and/or in response to a signal. Moreover, feature extraction module 114 can communicate with detection module 111 to provide network flow features in response to detection of a newly instantiated network flow. In other words, application-aware network control system 110 can include one or more rules to provide network flow features to a classifier training module or an application identification module when a newly instantiated network flow is detected.

As used herein, the term "provide" includes push mechanisms (e.g., sending data to a computing system or agent via a communications path or channel), pull mechanisms (e.g., delivering data to a computing system or agent in response to a request from the computing system or agent), and store mechanisms (e.g., storing data at a data store or service at which a computing system or agent can access the data). Thus, in some implementations, feature extraction module 114 can provide network flow features by pushing (or proactively sending) the network flow features to a classifier training module and/or an application identification module. In other implementations, feature extraction module 114 can provide network flow features by providing an API via which a classifier training module and/or an application identification module can access or request the network flow features. In yet other implementations, feature extraction module 114 can employ a combination of such mechanisms.

Furthermore, feature extraction module 114 is responsive to application identification signals that indicate a sufficient number of network flow features for a flow have been derived and/or provided. In response to such signals, feature extraction module 114 ceases to derive and/or provide network flow features. This allows feature extraction module 114 to efficiently use resources (e.g., processing or computing resources and network resources) by ceasing to derive and/or provide network flow features when additional network flow features would not be beneficial.

An application identification signal is a notification (e.g., a value transition, a data set, a message, or control data packet) that indicates a change of state of an application identification process. For example, an application identification signal can indicate that additional network flow feature are no longer required for identification an application at an application identification module or for generation of an application classifier at a classifier training module. Such application identification signals can be generated within application-aware network control system 110 (e.g., by feature extraction module 114 itself) or externally at a classifier training module, an application identification module, a network controller, and/or a network device. As specific example, an application identification signal can be generated when a data packet counter (or variable) within feature extraction module 114 reaches a predetermined value. As another example, an application identification signal can be a control data packet sent from an application identification module after a sufficient number of network flow features for a network flow have been received for a flow to identify the application communicating via that network flow by applying an application classifier to those network flow features.

Action module 115 applies actions to network flows. For example, action module 115 can receive an application identification report from an application identification module such as application identification module(s) 130 that includes an application identifier of an application associated with a network flow for which no application identifier was received by collection module 113. Action module 115 can then alter various parameters or properties of the network flow based on the application identification report or an action identifier included within the application identification report. For example, action module 115 can redirect the network flow to a different physical port of a network device, can alter network resources allocated to the network flow, can drop (or end) the network flow, apply predetermined or administratively assigned QoS to the network flow, apply predetermined or administratively assigned rate limiting to the network flow, or apply some other action to the network flow.

An application identification report includes the result of applying an application classifier to network flow features. For example, an application identification report can include an application identifier, an action identifier, additional data related to classification of a network flow, and/or a combination thereof.

The action to be applied can be specified or included (e.g., as an action identifier or implicitly by the application identifier) within the application identification report, accessed at a policy store that is established by a network controller at a network device or external to a network device, or can be specified by an entity such as a network controller within a control plane of a communications network. For example, application-aware network control system 110 can receive an application identification report from application classifier module(s) 130 that identifies the application associated with a network flow. Application-aware network control system 110 or a network device hosting application-aware network control system 110 can provide an API via which network controller 161 can determine the identity of the application associated with that network flow, and provide an action identifier to specify an action for action module 115 to apply to the network flow. Alternatively, network controller 161 can pre-program or configure application-aware network control system 110 (e.g., via the API) to perform an action if a particular application is identified.

In some implementations, an action module can be referred to as an enforcement module and is implemented at one or more network devices. For example, in some implementations an action module (or action modules) can be implemented (or hosted) at one or more edge devices to apply actions to network flows at an ingress of a communications network or at an egress of the communications network. In some implementations, an action module (or action modules) can be implemented at multiple network devices within a communications network. Thus, application identification reports can be provided to multiple network devices (or action modules hosted thereon) to apply actions consistently across network devices within (or of) a communications network.

Classifier training module(s) 120 is a combination of hardware and software that generates or trains application classifiers using network flow features of network flows and application identifiers of application associated with the network flows. For example, classifier training module(s) 120 may train (or generate) an application classifier (e.g., a machine learning classifier) using the network flow features of a group of network flows for one application or a group of applications. In some implementations, classifier training module(s) 120 derive additional network flow features from network flow features received from application-aware network control system 110.

As illustrated in FIG. 1, classifier training module(s) 120 can include one or more instances of a classifier training module. For example, a control plane of communications network 160 can include a cluster of classifier training modules hosted at various network devices within communications network 160. In some implementations, classifier training modules 120 within the cluster can be generic (i.e., can generate application classifiers for many applications or application types) and used to distribute generation of application classifiers across multiple network devices for load balancing. In other implementations, classifier training modules 120 within the cluster can be specific (i.e., can generate application classifiers for a single application or small number of applications or application types) and each is used to generate application classifiers for a specific application (or small number of applications) or application type. In other words, network flow features of network flows can be provided to different classifier training modules based on the application identifiers of the applications associated with those network flows.

Application classifiers generated (or trained) at classifier training module(s) 120 can be any of a variety of machine learning classifiers. For example, an application classifier can be a Naïve Bayes classifier, a support vector machine (SVM) based classifier, a C4.5 or C5.0 based decision tree classifier, or some other suitable machine learning classifier. A Naïve Bayes classifier is a simple probabilistic classifier based on applying Bayes theorem with strong independence assumptions. This classifier assumes that the network flow features are independent of each other given a class or application identifier of the network flow features provided as input. However, the network flow features need not necessarily be independent.

As another example, an SVM approach or mechanism may build an application classifier that maximizes the margin between different classes (e.g., two different classes) corresponding to different application identifiers. In a C4.5 based decision tree classifier, the classification rules may be implemented in a tree fashion where the answer to a decision rule at each node in the tree decides the path along the tree. The C5.0 based decision tree classifier also supports boosting, which is a technique for generating and combining multiple classifiers to improve prediction accuracy. Unlike Naïve Bayes, both SVM based and the decision tree classifiers may take into consideration the dependencies between different network flow features. In each of these classifiers, steps may be taken to prevent over-fitting of the classifier to the training data (e.g., network flow features and application identifiers), by using methods such as k-fold cross-validation.

Application identification module(s) 130 is a combination of hardware and software that applies application classifiers to network flow features (or, alternatively stated, applies network flow features to application classifiers) to determine an identity of applications associated with network flows from which those network flow features were derived. In other words, application identification module(s) 130 use application classifiers generated at and received from classifier training module(s) 120 to determine application identifiers of applications communicating via network flows. In some implementations, application identification module(s) 130 derive additional network flow features from network flow features received from application-aware network control system 110.

Similar to classifier training module(s) 120, as illustrated in FIG. 1, application identification module(s) 130 can include one or more instances of an application identification module. Thus, application identification module(s) 130 can be generic (e.g., apply many different application classifiers to network flow features of network flows) and used to distribute application identification across multiple network devices for load balancing. In other implementations, application identification module(s) 130 within the cluster can be specific (i.e., apply a single application classifier or small number of different application classifiers to network flow features of network flows) and each is used to identify a specific application (or small number of applications) or application type. Accordingly, network flow features of a network flow can be provided to multiple application identification modules to determine an identity of an application associated with that network flow.

Although particular modules (i.e., combinations of hardware and software) are illustrated and discussed in relation to application-aware network control system 110 specifically and FIG. 1 and other example implementations discussed herein generally, other combinations or sub-combinations of modules can be included within other implementations. Said differently, although modules illustrated in FIG. 1 and discussed in other example implementations perform specific functionalities in the examples discussed herein, these and other functionalities can be accomplished, implemented, or realized at different modules or at combinations of modules.

For example, two or more modules illustrated and/or discussed as separate can be combined into a module that performs the functionalities discussed in relation to the two modules. As another example, functionalities performed at one module as discussed in relation to these examples can be performed at a different module or different modules. Moreover, a module discussed herein in relation to a particular type of module can be implemented as a different type of module in other implementations. For example, a detection module can be implemented using a group of electronic and/or optical circuits (or circuitry) or as instructions stored at a non-transitory processor-readable medium or at a memory and executed at a processor. As another example, in some implementations, application-aware network control system 110 can include classifier training module(s) 120 and/or application identification module(s) 130.

As illustrated in FIG. 1, communications network 160 includes a variety of network devices. Specifically, as illustrated in FIG. 1, communications network 160 includes edge device 162, edge device 163, network device 164, network device 165, network device 166, and network device 167. Additionally, communications network 160 includes network controller 161. Network devices are computing systems that include one or more communications interfaces and communicate one with another via these communications interfaces to transport data within a communications network. For example, routers, switches, wireless access points, gateways, bridges, load balancers, servers, and similar computing systems can be network devices. Network devices with which endpoints of network flows (e.g., computing systems hosting applications that communicate via a communications network) communicate directly can be referred to as edge devices (i.e., such devices operate at an edge of a communications network).

In the example illustrated in FIG. 1, communication network 160 includes network controller 161. Network controller 161 is a module hosted at a network device or a computing system in communication with communications network 160 that provides routing, forwarding, and other management information to network devices within communications network 160. In other words, communications network 160 can be an SDN. Network controller 161 can communicate with network devices of communications network 160 via protocol such as OpenFlow® to control or manage those network devices.

Application-aware network control system 110, classifier training module(s) 120, and application identification module(s) 130 can be hosted at any of the network devices of communications network 160 or at other computing systems (e.g., middle boxes) in communication with communications network 160. In some implementations, such other computing systems can be said to be part of or within a control plane of communications network 160. In some implementations, two or more of application-aware network control system 110, classifier training module(s) 120, and application identification module(s) 130 are hosted at a common network device. In other implementations, application-aware network control system 110, classifier training module(s) 120, and application identification module(s) 130 are hosted at different network devices.

For example, application-aware network control system 110 and application identification module(s) 130 can be hosted at edge device 162 and classifier training module(s) 120 can be hosted at network device 167. In some implementations, application-aware network control system 110 can be beneficially hosted at edge devices of a communications network because some network flows do not pass through or traverse network devices within an internal layer or core of a communications network. For example, network flows for peer-to-peer application may not traverse network devices other than edge devices. Accordingly, for some communications networks and/or applications more network flows are accessible to an application-aware network control system hosted at an edge device than to a application-aware network control system hosted at other network devices.

Agents 141 and 142 are application identification agents hosted at computing systems (only device 151 which hosts agent 141 is illustrated in FIG. 1 for simplicity). Path 180 illustrates a network flow through communications network 160. More specifically, an application hosted at device 151 initiates a network flow to network service 192. Said differently, that application requests access to network service 192 via the network flow illustrated by path 180. Network services 191 and 192 are services such as webpages or websites, data repositories such as database management systems, communications applications such as streaming video or audio applications, collaboration applications, or other services accessible via a communications network.

Data packets communicated between the application hosted at device 151 and network resource 192 traverse edge device 162 and network devices 164, 165, and 166. Accordingly, application-aware network control system 110 can be hosted at any of these network devices (i.e., edge device 162 and network devices 164, 165, and 166) to derive network flow features from the network flow illustrated by path 180 to train a classifier by providing network flow features and an application identifier received from agent 141 to classifier training module(s) 120, or to identify an application associated with the network flow illustrated by path 180 by providing network flow features to application identification module(s) 130.

Moreover, using application classifiers generated based on application identifiers received from application identification agents 141 and/or 142 and network flow features of network flows associated with applications having those application identifiers, application-aware network control system 110 can identify applications associated with network flows from or to devices at which application identification agents are not hosted. For example, application-aware network control system 110 can be hosted at one or more network devices of communications network 160 through which a network flow from an application hosted at device 152 traverses. Application-aware network control system 110 can provide network flow features of that network flow to application identification module(s) 130 (which may be co-hosted with or included within application-aware network control system 110), and application identification module(s) 130 can apply those application classifiers to identify the application associated with that network flow. Thus, applications at devices that do not host application identification agents can be identified according to methodologies discussed herein.

Figure 2:
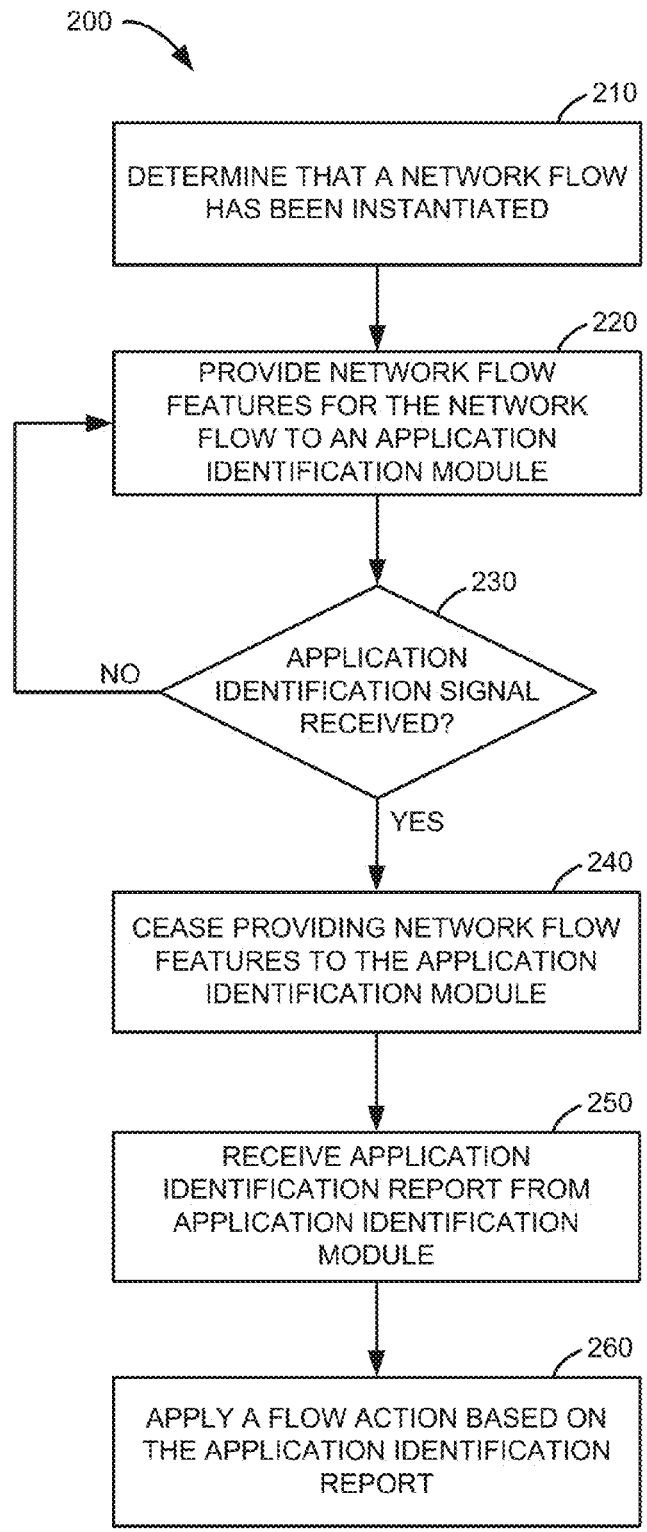
FIG. 2 is a flowchart of an application-aware network management process, according to an implementation.

FIG. 2 is a flowchart of an application-aware network management process, according to an implementation. In the example illustrated by process 200, application classifiers have previously been generated. Generation of application classifiers will be discussed in more detail in other examples such as those discussed in relation to FIGS. 3 and 4. Process 200 can be implemented by an application-aware network control system (or components such as modules thereof) such as application-aware network control system 110 hosted at a network device or other computing system. Accordingly, statements herein made in reference to process 200 performing some action should be understood to mean that an application-aware network control system implementing process 200 performs those actions.

Moreover, process 200 illustrated in FIG. 2 is an example implementation of an application-aware network management process. As noted in some examples herein, in other implementations, a resource classification process can include additional, fewer, or different blocks (or steps) than illustrated in FIG. 2.

At block 210, process 200 determines that a network flow has been instantiated within a communications network. For example, a detection module can identify a newly instantiated network flow at a network device of a communications network. In response to the determination at block 210, network flow features of the newly instantiated network flow are provided to an application identification module at block 220. As a specific example, an extraction module in communication with the detection module in the example above can derive network flow features of the newly instantiated network flow and provide those network flow features to an application identification module. In this example, the application identification module has access to previously generated application classifiers.

Network flow features are provided to the application identification module until an application identification signal is received (or detected) at block 230. After the application identification signal is received (or detected) at block 230, process 200 ceases providing the network flow features to the application identification module. For example, network flow features can be provided to the application identification module until an application identification signal is received from the application identification module.

In other implementations, network flow features are derived until an application identification signal is received (or detected) at block 230 in response to which process 200 ceases deriving the network flow features. The derived network flow features are then provided to the application identification module after the application identification signal (directly or via some other entity such as a network controller) is received in response to the application identification signal. In yet other implementations, network flow features are derived until an application identification signal is received (or detected) at block 230, and then the derived network flow features are provided to the application identification module after the application identification signal is received in response to a request for the network flow features from the application identification module. For example, the application identification module can request the network flow features via an API of an application-aware network control system implementing process 200.

At block 250, an application identification report including an application identifier of the application associated with the newly instantiated network flow is received from the application identification module. For example, the application identification module can apply one or more application classifiers generated at a classifier training module to the network flow features to determine an identity of the application associated with the newly instantiated network flow, and can provide the application identification report identifying that application to process 200.

In some implementations, the application identification report is received from some other entity such as a network controller within a control plane of a communications network. For example, the application identification module can provide the application identifier (or an application identification report including the application identifier) to the network controller, and the network controller can provide the application identification report to process 200. In yet other implementations, an action identifier is included in the application identification report is received by process 200. That is, in some such implementations, the application identification report does not include an application identifier. Rather, the application identification report includes an action identifier that describes or defines an action to be applied to the newly instantiated network flow.

Process 200 then applies at block 260 a flow action to the newly instantiated network flow based on the information received at block 250. In the example illustrated in FIG. 2, a flow action is applied to the newly instantiated network flow based on an application identification report. As discussed above, the application identification report can include an application identifier, an action identifier, and/or a combination thereof.

Figure 3:
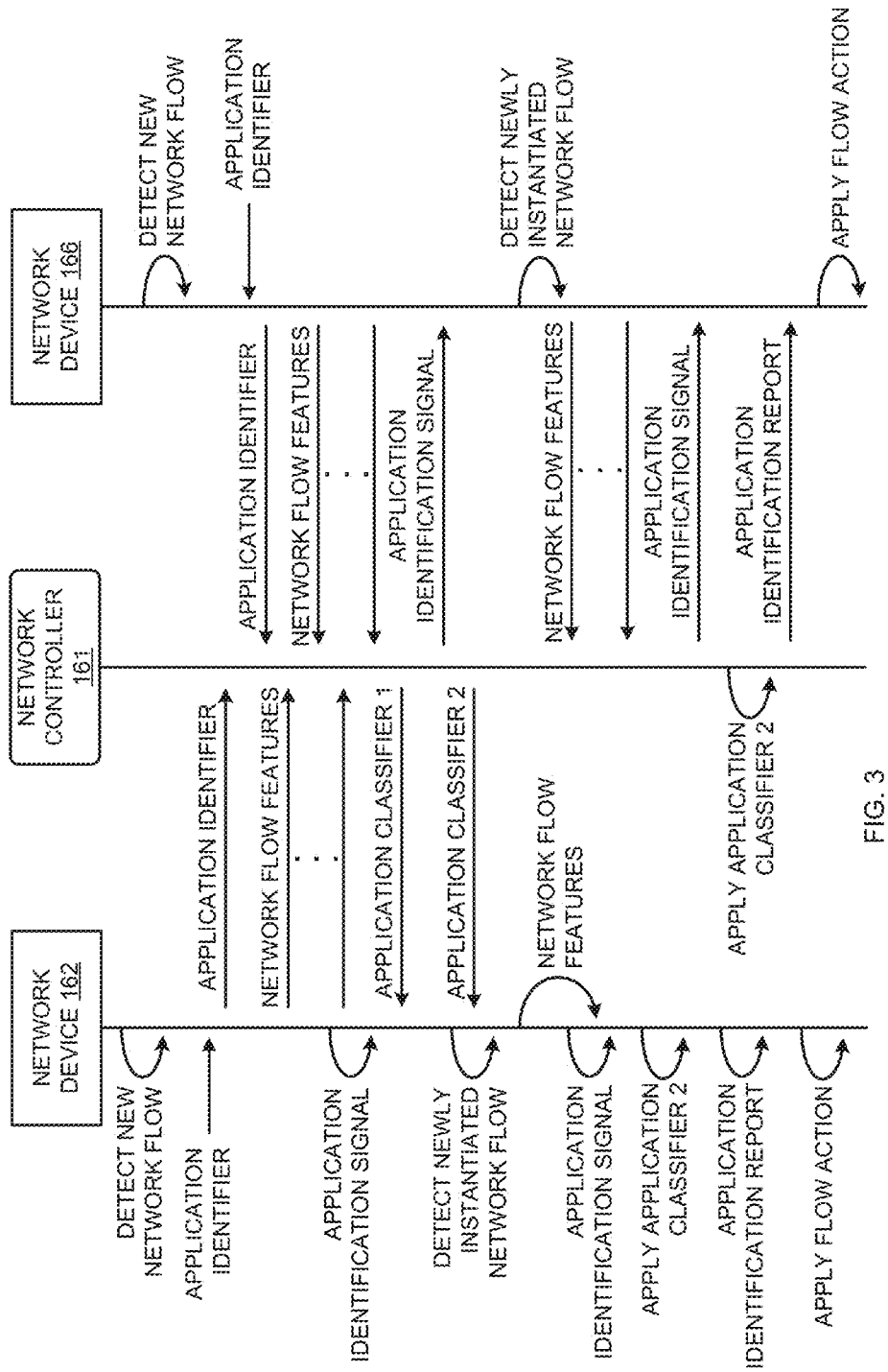
FIG. 3 is a latter diagram illustrating communication flow between a network controller and network devices, according to an implementation.

FIG. 3 is a latter diagram illustrating communication flow between a network controller and network devices, according to an implementation. In the example illustrated in FIG. 3, network device 162 and network device 166 each host an application-aware network control system such as application-aware network control system 110 illustrated in and discussed above in relation to FIG. 1. In addition to hosting an application-aware network control system, network device 162 also hosts an application identification module. For example, the application identification module can be hosted in an application space or user space at network device 162. Network controller 161 includes (or is co-hosted at a network device with) a classifier training module and an application identification module. References herein to network device 162, network device 166, or network controller 161 performing some action of an application-aware network control system, an application identification module, or a classifier training module as discussed above should be understood to mean that an application-aware network control system, an application identification module, or a classifier training module as discussed hosted at or with network device 162, network device 166, or network controller 161 performs that action.

A new network flow is detected and an application identifier of an application associated with that network flow is received from an application identification agent at network device 162 (i.e., by the application-aware network control system hosted at network device 162). Similarly, a different new network flow is detected and an application identifier of an application associated with that network flow is received from an application identification agent at network device 166 (i.e., by the application-aware network control system hosted at network device 166). In this example, the network flows detected by network devices 162 and 166 are associated with separate instances of the same application. In other words, the application identifiers received by network devices 162 and 166 are the same.

In response to detection of a new network flow and receipt of an application identifier (e.g., based on a rule or rules of a policy established by network controller 161 at network devices 162 and 166), each of network device 162 and network device 166 provides the application identifier received from the application identification agents to network controller 161, and derives and provides network flow features for the new network flow detected at each to network controller 161 (i.e., to the classifier training module included or co-hosted with network controller 161).

Network device 162 then determines, based on an application identification signal generated at network device 162 (e.g., in response to a data packet counter reaching a predetermined value), that a sufficient number of network flow features have been provided to network controller 162 and ceases to provide network flow features to network controller 161. Network controller 161 then generates (or trains) application classifier 1, and provides application classifier 1 to network device 162. Application classifier 1 will be used at the application identification module hosted at network device 162 to determine whether a network flow is associated with the application identified by the application identifier previously received by network device 162. In some implementations, an application identification module has access to more than one application classifier to identify various different applications from network flow features. Here, an application classifier for only a single application is illustrated for simplicity.

Network controller 161 monitors the network flow features received from network device 166 and provides an application identification signal to network device 166 when a sufficient quantity of network flow features have been provided to generate (or revise) an application classifier. Because the network flow features provided by network device 166 are for a common application with the network flow features provided by network device 162, network controller revises application classifier 1 (an initial application classifier) using the network flow features from network device 166 to generate application classifier 2 (a revised application classifier). Additionally, network controller 161 provides application classifier 2 to network device 162 because network device 162 hosts an application identification module.

As illustrated in FIG. 3, because network device 162 hosts an application identification module, network device 162 does not send network flow features to network controller. Rather, network device 162 applies application classifiers received from network controller 161 (e.g., application classifier 2) to network flow features derived at network device 162 using the application identification module hosted at network device 162.

More specifically, network device 162 detects a newly instantiated network flow and derives network flow features of that network flow and provides those network flow features to the application identification module hosted at network device 162. Network device 162 ceases deriving and providing the network flow features in response to an application identification signal, and then applies application classifier 2 to the network flow features derived from the newly instantiated network flow. In other words, application classifier 2 is used to classify the newly instantiated network flow based on the network flow features.

As discussed above, in some implementations, an application identification module can include multiple application classifiers and can apply more than one application classifier to network flow features to identify an application associated with the network flow from which those network flow features were derived. The result of the classification is an application identification report that identifies the application associated with the newly instantiated network flow. Network device 162 then applies a flow action based on the identity of that application.

In contrast, network device 166 does not include an application identification module, and relies on the application identification module within or co-hosted with network controller 161 for determination of application identities. More specifically as illustrated in the example shown in FIG. 3, network device 166 detects a newly instantiated network flow and, in response, derives and provides network flow features to network controller 161. After a sufficient quantity of network flow features have been derived from the newly instantiated network flow and provided to network controller 161, network controller 161 provides an application identification signal to network device 166 to notify network device 166 that additional network flow features are not required. Network device 166 ceases deriving and/or providing the network flow features in response to the application identification signal.

Network controller 161 then applies application classifier 2 to the network flow features provided by network device 166 to determine the identity of the application associated with the newly instantiated network flow. As discussed above, in some implementations, an application identification module can include multiple application classifiers and can apply more than one application classifier to network flow features to identify an application associated with the network flow from which those network flow features were derived.

The result of the classification is an application identification report that identifies the application associated with the newly instantiated network flow. Network controller 161 provides the application identification report to network device 166. Network device 166 receives the application identification report and then applies a flow action based on the identity of the application associated with the newly instantiated network flow.

The processes discussed herein will continue as additional newly instantiated network flows are detected at network devices 162 and 166 and, for some newly instantiated network flows, application identifiers are received. In other words, network devices 162 and 166 and network controller 161 can continue to function as described herein to generate new or refined application classifiers and to determine the identities of applications associated with newly instantiated network flows.

In other implementations various details of the example discussed in relation to FIG. 3 can differ. For example, in other implementations, additional network devices, application classifiers, and/or classifier training modules can be used. Moreover, in some implementations, a classifier training module is not co-hosted with a network controller, but is hosted at a separate network device.

Figure 4:
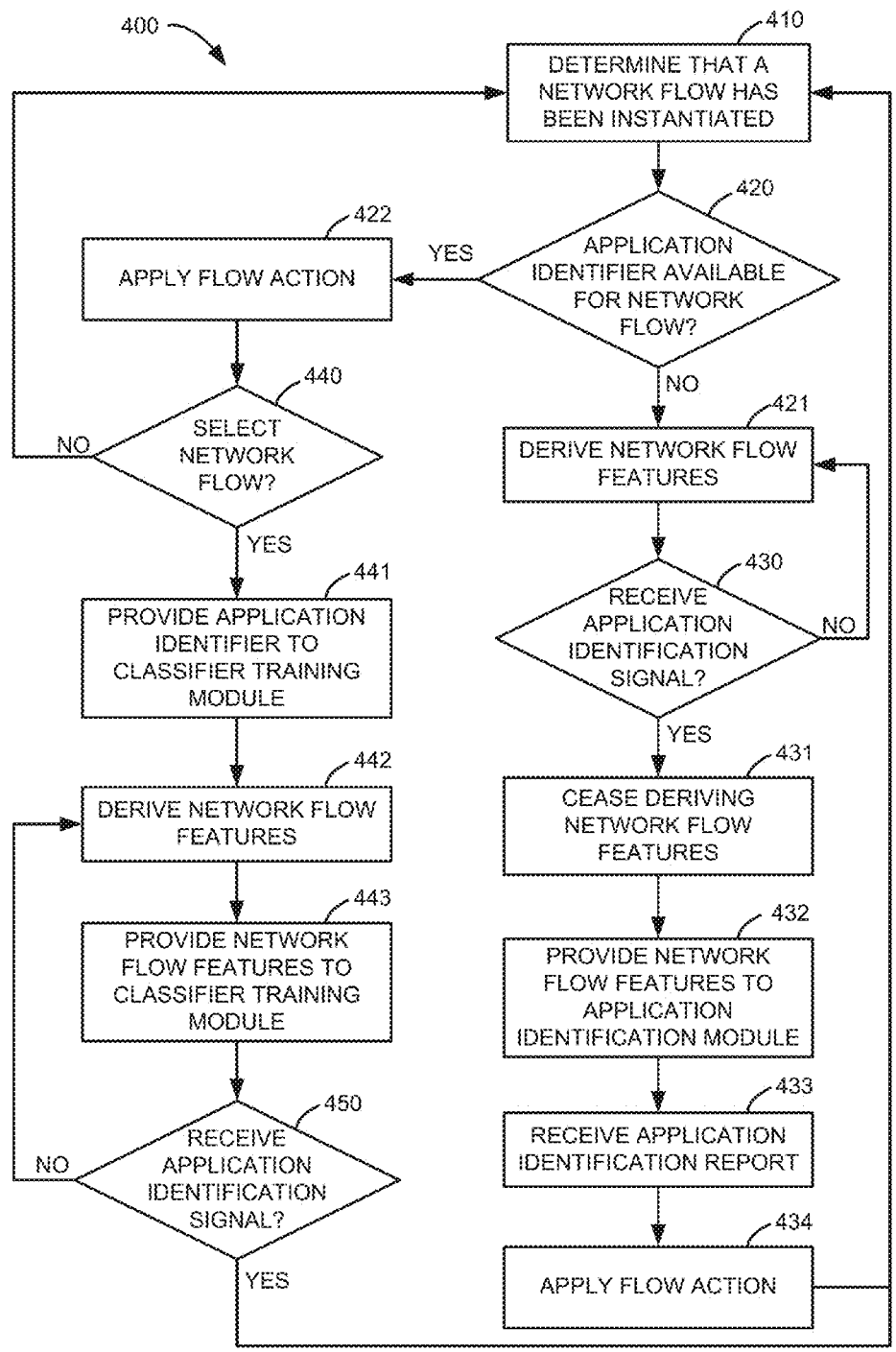
FIG. 4 is a flowchart of an application-aware network management process, according to another implementation.

FIG. 4 is a flowchart of an application-aware network management process, according to another implementation. Process 400 can be implemented by an application-aware network control system (or components such as modules thereof) such as application-aware network control system 110 hosted at a network device or other computing system. Accordingly, statements herein made in reference to process 400 performing some action should be understood to mean that an application-aware network control system implementing process 200 performs those actions.

Moreover, process 400 illustrated in FIG. 4 is an example implementation of an application-aware network management process. As discussed in some examples herein, in other implementations, a resource classification process can include additional, fewer, or different blocks (or steps) than illustrated in FIG. 4.

At block 410, process 400 determines that a network flow has been instantiated and, at block 420 determines whether an application identifier is available for that network flow. If an application identifier is not available for that network flow (e.g., an application identifier has not been provided by an application identification agent), that network flow should be classified to determine an identity of the application associated with that network flow. Accordingly, network flow features are derived from the network flow at block 421 until an application identification signal is received at block 430.

In response to receiving the application identification signal at block 430, process 400 ceases deriving the network flow features from the network flow and provides the network flow features to an application identification module at block 432. The application identification module applies one or more application classifiers to the network flow features derived at block 421 to classify the network flow and determine an identity of the application associated with the network flow, and generates an application identification report. The application identification report is received at block 433, and process 400 applies a flow action to the network flow at block 434 based on the application identification report. Process 400 then proceeds to block 410 to identify additional newly instantiated network flows.

Referring again to block 420, if an application identifier is available (e.g., has been received from an application identification agent) for the network flow, a flow action can be applied to the flow at block 422 based on that application identifier. In other implementations, a flow action can be applied to the flow after block 440 or after block 450 based on that application identifier.

Process 400 then determines at block 440 whether to select the network flow for use in generating (or defining) or refining an application classifier. As discussed above, process 400 can select network flows using a variety of criteria and methodologies. If the network flow is not selected at block 440, process 400 proceeds to block 410 to identify additional newly instantiated network flows. However, if the network flow is selected at block 440, information about the network flow is provided to a classifier training module to generate or refine an application classifier.

More specifically, in the example illustrated in FIG. 4, the application identifier for the network flow is provided to the classifier training module at block 441, network flow features are derived from the network flow at block 442, and the network flow features are provided to the classifier training module at block 443. Blocks 442 and 443 are repeated until an application identification signal is received at block 450 and process 400 ceases deriving and providing the network flow features. As discussed above, and illustrated by blocks 421, 430, 431 and 432, in some implementations, network flow features are derived until an application identification signal is received, in response to which process 400 ceases deriving the network flow features and provides the network flow features to an entity such as a classifier training module or an application identification module.

After process 400 ceases deriving and providing the network flow features to the classifier training module in response to the application identification signal received at block 450, process 400 proceeds to block 410 to identify additional newly instantiated network flows. The classifier training module generates (or revises) an application classifier and provides the application classifier to one or more application identification modules.

As discussed above, various modifications can be made to the example illustrated in FIG. 4. For example, in some implementations, process 400 receives one or more application identification reports before an application identification signal is received. Moreover, process 400 can apply flow actions in response to such application identification reports before an application identification signal is received. This can be useful, for example, to allow an application identification module to provide preliminary application identification reports to an application-aware network control system, in response to which the application-aware network control system can apply some actions while identification of an application associated with a network flow is refined.

As a specific example, the application associated with a network flow can be a particular video conferencing application, and an application identification module can include generic application classifiers for collaboration applications and video conferencing applications and a specific application classifier for the particular video conferencing application. After a small quantity of network flow features derived from the network flow are applied to these classifiers, the application identification module identifies the application generically as a collaboration application and provides a preliminary application identification report identifying the application generically as a collaboration application to the application-aware network control system. A preliminary application identification report is an application identification report for which refined application identification report or reports are expected. A refined application identification report is an application identification report which is more specific or particular than a preliminary application identification report. In response, the application-aware network control system applies a corresponding flow action.

After additional network flow features derived from the network flow are applied to these classifiers, the application identification module identifies the application generically as a video conferencing application and provides a preliminary application identification report identifying the application generically as a video conferencing application to the application-aware network control system. Here, this preliminary application identification report can also be referred to as a refined application identification report of the previous preliminary application identification report. In response to this preliminary application identification report, the application-aware network control system applies a flow action corresponding to generic video conferencing applications.

Finally, after additional network flow features derived from the network flow are applied to these classifiers, the application identification module identifies the application specifically as the particular video conferencing application and provides a refined application identification report identifying the application specifically as the particular video conferencing application to the application-aware network control system and an application identification signal. Here, this application identification report is not referred to as a preliminary application identification report because no further refined application identification report or reports are expected. In response to this refined application identification report, the application-aware network control system ceases to derive and provide network flow features, and applies a flow action corresponding to that particular video conferencing application. Accordingly, various flow actions can be applied to a network flow while network flow features are derived from the network flow.

Figure 5:
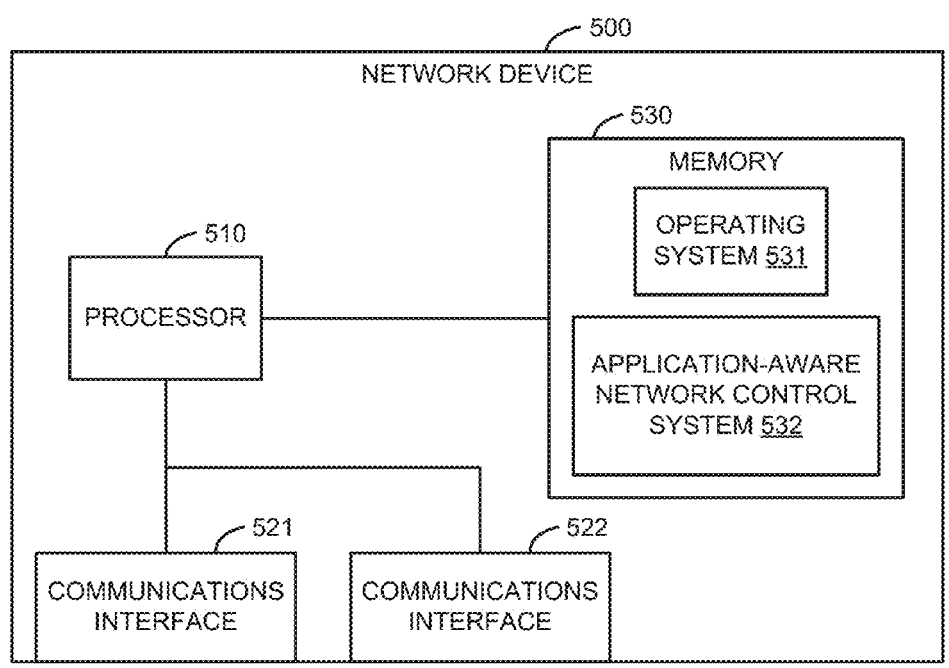
FIG. 5 is a schematic block diagram of a network device hosting an application-aware network control system, according to an implementation.

FIG. 5 is a schematic block diagram of a network device hosting an application-aware network control system, according to an implementation. In the example illustrated in FIG. 5, network device 500 includes processor 510, communications interfaces 521 and 522, and memory 530. Network device 500 can be, for example, a switch, a router, a bridge, a gateway, a server, or some other network device. In some implementations, a network device hosting an application-aware network control system is referred to itself as an application-aware network control system.

Processor 510 is any combination of hardware and software that executes or interprets instructions, codes, or signals. For example, processor 510 can be a microprocessor, an application-specific integrated circuit (ASIC), a graphics processing unit (GPU) such as a general purpose GPU (GPGPU), a distributed processor such as a cluster or network of processors or computing systems, a multi-core or multi-processor processor, or a virtual or logical processor of a virtual machine. As a specific example, in some implementations, processor 510 can include multiple processors such as one or more general purpose processors and one or more application-specific data packet processors to process data packets at high speed or line rate of communications interfaces 521 and 522.

Communications interface 520 is a module via which processor 510 can communicate with other processors, network devices, or computing systems via a communications link. As a specific example, communications interface 520 can include a network interface card and a communications protocol stack hosted at processor 510 (e.g., instructions or code stored at memory 530 and executed or interpreted at processor 510 to implement a network protocol) to receive data from and send data to resource authorities. As specific examples, communications interface 520 can be a wired interface, a wireless interface, an optical interface, an Ethernet interface, a Fiber Channel interface, an InfiniBand interface, an IEEE 802.11 interface, or some other communications interface via which processor 510 can exchange signals or symbols representing data to communicate with other processors or computing systems.

Memory 530 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 530 can be a volatile random access memory (RAM), a persistent data store such as a hard-disk drive or a solid-state drive, a compact disc (CD), a digital versatile disc (DVD), a Secure Digital™ (SD) card, a MultiMediaCard (MMC) card, a CompactFlash™ (CF) card, or a combination thereof or of other memories. In other words, memory 530 can represent multiple processor-readable media. In some implementations, memory 530 can be integrated with processor 510, separate from processor 510, or external to computing system 500.

Memory 530 includes instructions or codes that when executed at processor 510 implement operating system 531 and other modules such as components (or modules) of application-aware network control system 532. In other words, instructions or codes stored at memory 530 can be referred to as modules. Memory 530 is also operable to store additional codes or instructions to implement other modules not illustrated in FIG. 5 and/or other data sets such as routing or forwarding tables.

In some implementations, network device 500 can be a virtualized network device. For example, network device 500 can be hosted as a virtual machine at a computing server or a physical network device.

Application-aware network control system 532 can be accessed or installed at network device 500 from a variety of memories or processor-readable media. For example, network device 500 can access application-aware network control system 532 at a remote processor-readable medium via a communications interface (not shown). As a specific example, network device 500 can be a network-boot device that accesses operating system 531 and components of application-aware network control system 532 during a boot process (or sequence).

As another example, resource 500 can include (not illustrated in FIG. 5) a processor-readable medium (e.g., embedded FLASH memory, a solid-state disk drive, or a hard-disk drive) or a device to access such a processor-readable medium, and can access components of application-aware network control system 532 at a processor-readable medium via that processor-readable medium access device.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or components in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the singular forms "a," "an," and "the" include plural referents unless the context clearly dictates otherwise. Thus, for example, the term "module" is intended to mean one or more modules or a combination of modules. Furthermore, as used herein, the term "based on" means "based at least in part on." Thus, a feature that is described as based on some cause, can be based only on the cause, or based on that cause and on one or more other causes.

What is claimed is:

1. A processor-readable medium storing code representing instructions that when executed at a processor cause the processor to:
   determine that a network flow has been instantiated;
   derive, in response to determining the network flow has been instantiated, network flow features associated with the network flow;
   provide the network flow features to an application identification module;
   cease deriving the network flow features to the application identification module in response to an application identification signal; and
   apply a flow action to the network flow based on an application identification report received from the application identification module.

2. The processor-readable medium of claim 1, further storing code representing instructions that when executed at the processor cause the processor to:
   receive an application identifier from an application identification agent; and
   provide the application identifier to an classifier training module in communication with the application identification module to provide an application classifier to the application identification module.

3. The processor-readable medium of claim 1, wherein:
   the application identification signal is generated in response to transmission of a predetermined number of data packets within the network flow; and
   the network flow features are derived from the predetermined number of data packets.

4. The processor-readable medium of claim 1, further storing code representing instructions that when executed at the processor cause the processor to:

receive the application identification signal from the application identification module.

5. The processor-readable medium of claim 1, wherein the application identification report is a refined application identification report and the flow action is a second flow action, the processor-readable medium further storing code representing instructions that when executed at the processor cause the processor to:

receive, at a first time, a preliminary application identification report from the application identification module;

apply a first flow action to the network flow based on the preliminary application identification report; and receive, at a second time after the first time, the refined application identification report from the application identification module, the second flow action based on the refined application identification report.

6. The processor-readable medium of claim 1, further storing code representing instructions that when executed at the processor cause the processor to:

access a flow action identifier of the flow action from one of the application identification module or a policy store.

7. An application-aware network management method, comprising:

selecting a first plurality of network flows, each network flow from the plurality of network flows being a newly instantiated network flow;

determining that an application identifier is available for each network flow from the first plurality of network flows;

deriving network flow features for each network flow from the first plurality of network flows and for each network flow from a second plurality of network flows;

providing the network flow features and the application identifier for each network flow from the first plurality of network flows to an classifier training module;

providing the network flow features for each network flow from the second plurality of network flows to an application identification module; and ceasing the providing the network flow features for each network flow from the first plurality of network flows and the second plurality of network flows in response to an application identification signal for that network flow.

8. The method of claim 7, wherein the selecting is randomly selecting or adaptively selecting.

9. The method of claim 7, further comprising:

receiving from the application identification module application identification reports associated with network flows from the second plurality of network flows; and applying flow actions to network flows from the second plurality of network flows associated application identification reports.

10. An application-aware network control system, comprising:

a detection module to detect instantiation of a first plurality of network flows, the first plurality of network flows including a second plurality of network flows and a third plurality of network flows;

a selection module to select the second plurality of network flows from the first plurality of network flows;

an collection module to receive a plurality of application identifiers and to provide the plurality of application identifiers to an classifier training module, each application identifier from the plurality of application identifiers associated with a network flow from the second plurality of network flows;

a feature extraction module to derive network flow features for each network flow from the first plurality of network flows, to provide to the classifier training module the network flow features for each network flow from the second plurality of network flows, and to cease deriving the network flow features for each network flow from the first plurality of network flows in response to an application identification signal associated with that network flow; and an action module to apply a flow action to each network flow from the third plurality of network flows based on application identification reports received from an application identification module.

11. The system of claim 10, wherein the selection module randomly selects the second plurality of network flows from the first plurality of network flows.

12. The system of claim 10, wherein the selection module adaptively selects the second plurality of network flows from the first plurality of network flows.

13. The application-aware network system of claim 10, further comprising:

the classifier training module, the classifier training module to generate application classifiers based on the plurality of application identifiers and the network flow features for the plurality of network flows and to provide the application classifiers to the application identification module.

14. The system of claim 10, wherein the feature extraction module is to derive network flow features for each network flow from the third plurality of network flows and to provide to the application identification module the network flow features for the third plurality of network flows;

the system further comprising:

the application identification module, the application identification module is to receive application classifiers from the classifier training module, to identify applications associated with the third plurality of network flows by applying the application classifiers to the network flow features for the third plurality of network flows, and to generate the application identification reports.

15. The system of claim 10, wherein application identifiers are received from a plurality of application identification agents, each application identification agent from the plurality of application identification agents is hosted at a network host and provides application identifiers in response to requests for network flows from applications hosted at the network host.

* * * * *